United States Patent
Kettunen et al.

(10) Patent No.: US 10,662,584 B2
(45) Date of Patent: May 26, 2020

(54) METHOD, SYSTEM AND A COMPUTER PROGRAM PRODUCT FOR CONDITION MONITORING OF A CONTINUOUS ELEMENT MOVING IN A FIBER WEB OR PAPER FINISHING MACHINE

(71) Applicant: Valmet Technologies Oy, Espoo (FI)

(72) Inventors: Heikki Kettunen, Espoo (FI); Gerald Kramer, Rockton, IL (US); Tatu Pitkänen, Nummenkylä (FI); James Sipprell, Ridgefield, WA (US); Todd Vandenheuvel, Hortonville, WI (US)

(73) Assignee: Valmet Technologies Oy, Espoo (FI)

( * ) Notice: Subject to any disclaimer, the term of this patent is extended or adjusted under 35 U.S.C. 154(b) by 89 days.

(21) Appl. No.: 16/079,877

(22) PCT Filed: Feb. 24, 2017

(86) PCT No.: PCT/FI2017/050121
§ 371 (c)(1),
(2) Date: Aug. 24, 2018

(87) PCT Pub. No.: WO2017/144784
PCT Pub. Date: Aug. 31, 2017

(65) Prior Publication Data
US 2019/0048526 A1 Feb. 14, 2019

(30) Foreign Application Priority Data

Feb. 25, 2016 (FI) ...................................... 20165145

(51) Int. Cl.
*B65H 18/26* (2006.01)
*D21G 9/00* (2006.01)
*G01L 5/108* (2020.01)

(52) U.S. Cl.
CPC ............ *D21G 9/0036* (2013.01); *B65H 18/26* (2013.01); *G01L 5/108* (2013.01); *B65H 2515/314* (2013.01); *B65H 2801/84* (2013.01)

(58) Field of Classification Search
USPC ........................................................ 162/198
See application file for complete search history.

(56) References Cited

U.S. PATENT DOCUMENTS 7,444,862 B2 * 11/2008 Innala ................ B65H 23/0204
73/159

FOREIGN PATENT DOCUMENTS

| EP | 2192066 A2 | 6/2010 |
|---|---|---|
| EP | 2644772 A1 | 10/2013 |
| WO | 2006075055 A1 | 7/2006 |
| WO | 2008049973 A2 | 5/2008 |
| WO | 2009092761 A2 | 7/2009 |
| WO | 2009101255 A1 | 8/2009 |
| WO | 2011134487 A1 | 11/2011 |

OTHER PUBLICATIONS

Valmet Technical Paper Series, iRoll™—the intelligent roll. Valmet. Published Jan. 25, 2011, http://www.valmet.com/globalassets/media/downloads/white-papers/roll-services/wpr_iroll.pdf, downloaded Aug. 1, 2018.
Valmet Technical Paper Series, iRoll Update. Valmet. Published Jul. 18, 2014, http://www.valmet.com/global assets/media/downloads/white-papers/roll-services/wpr_irollupdate.pdf, downloaded Aug. 1, 2018.
International Search Report for PCT/FI2017/050121 dated Jun. 6, 2017.
Written Opinion of the International Searching Authority for PCT/FI2017/050121 dated Jun. 6, 2017.

* cited by examiner

*Primary Examiner* — Mark Halpern
(74) *Attorney, Agent, or Firm* — Stiennon & Stiennon (57) ABSTRACT

The invention relates to a method for monitoring the condition of a continuous element (44) moving in a fiber web or paper finishing machine, said monitoring being performed with a rotating machine element (41), which is equipped with a sensor assembly (24) that measures force or pressure and against which the continuous element moves. In the method, the machine element is made to rotate against the continuous element, a measurement signal (25) is generated between the machine element and the continuous element with the sensor assembly, and a cross-directional profile (21) of force or pressure generated between the machine element and the continuous element is formed from the measurement signal. Said moving continuous element is a fabric (32, 33) installed in a fabric run (22, 23) traveling via the machine element. In the method, the fabric is additionally installed in a fabric run, wherein it moves via said machine element equipped with a sensor assembly, a reference profile (35) is formed for the cross-directional profile after installing the fabric in the fabric run, the cross-directional profile formed from the measurement signal and representing force or pressure generated between the machine element and the fabric is compared with the reference profile, and information (37) is produced from the comparison for monitoring the condition of the fabric. The invention also relates to a corresponding system and a computer program product.

17 Claims, 7 Drawing Sheets

METHOD, SYSTEM AND A COMPUTER PROGRAM PRODUCT FOR CONDITION MONITORING OF A CONTINUOUS ELEMENT MOVING IN A FIBER WEB OR PAPER FINISHING MACHINE

CROSS REFERENCES TO RELATED APPLICATIONS

This application is a U.S. national phase of PCT/FI2017/050121 filed on Feb. 24, 2017 and claims priority on FI 20165145 filed on Feb. 25, 2016, both of which are incorporated herein by reference

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for monitoring the condition of a continuous element moving in a fiber web or paper finishing machine, said monitoring being performed with a rotating machine element, which is equipped with a sensor assembly that measures force or pressure and against which the continuous element moves, and wherein
  the machine element is made to rotate against the continuous element,
  a measurement signal is generated between the machine element and the continuous element with the sensor assembly,
  a cross-directional profile of force or pressure generated between the machine element and the continuous element is formed from the measurement signal.
The invention also relates to a corresponding system and a computer program product.

Profiles, quality and/or tightness of parent rolls produced by paper machines and paper finishing processes have conventionally been monitored with manual methods. One of these is the knocking of parent rolls between reel rails during the operation of the machine. In this case, the user of the measuring device (wooden block or "Beloit Hammer") goes in front of a rotating winding-up parent roll to perform the measurement. The user walks in the cross direction of the machine from side to side scanning, by knocking, the variations in the tightness and/or hardness of the parent roll and the quality of the roll in general. Based on the observations, conclusions are drawn regarding paper profiles, needs of profiling changes and modification needs of reel parameters (such as linear load).

Recently, safety at work has increasingly come to the fore in all aspects related to operating of paper machines. One manifestation of this is the attempt to prevent operators from going inside a paper machine, near rotating rolls, for example. For this objective, safety gates and light curtains are installed, for example. These ensure that one cannot access dangerous places during the machine operation. In new machines, such safety fittings are already standard equipment, particularly at reels and winders. In old machines, they will become more and more common as the machines are rebuilt. In western countries, user safety must be taken into account in each machine rebuild, and everything must be done to maximize safety. In practice, this leads to the necessity of denying user access to dangerous places.

Due to the aforementioned reasons, it is impossible for operators in many machines to gain access to profile monitoring in the wind-up section, which is an essential part of machine monitoring. This is because access between the reel rails is forbidden during the machine operation. This prohibition is further strengthened by equipping the reel with safety gates. Opening the door of the gates stops the production. The introduction of these safety improvements is grounded, since, when a web break occurs, an operator knocking a roll is in danger. This also applies to situations in which a parent roll starts to decompose for some reason. In such a situation, an operator feeling the surface of a parent roll will certainly get hurt and the risk of death is significant.

In addition to the knocking performed in an operating machine, it is of course also possible to try to monitor roll profiles by measuring, knocking and/or manually probing parent rolls that have already been completed and stopped. In this case, it is already late for any improving actions, as the roll is already completed. At this stage, nothing can any longer be done to improve its tightness or other properties. Furthermore, the measuring of even stopped parent rolls begins to be challenging today for safety reasons. In addition, it is difficult to enter the winder's unwinder or the preceding reel spool storage rails because of safety gates, for example. In some cases, the same applies even to shipping roll sets completed at the winder. In some mills (particularly in North America), access to the dry end side of the winder is also restricted.

In addition to the aforementioned rolls, manual methods have traditionally also been used to monitor paper machine fabrics. One example of these is the measurement of fabric tension with a manually operated tension measurement device. In this case, the user of the measurement device goes to a suitable position in a fabric run, close to the fabric, and presses the device against the fabric. The user walks in the cross direction of the machine from side to side scanning in this way variations in the fabric tension in the cross direction. Based on the measurement, it is possible to draw conclusions about the fabric condition, possible slackened areas and the future fabric change requirement. The condition of a fabric can also be monitored during the machine operation with moisture or permeability measurements.

Fabric and web tension measurement with a roll equipped with sensors is known from FI patent 113804. However, this publication does not propose a method for condition monitoring of a target element; instead, monitoring of both the fabric condition/wear and the roll quality/hardness have practically been implemented with the aforementioned manual methods.

For the aforementioned reasons alone, many mills have started to look for possibilities to get rid of fabric scanning and other inspections related to their condition performed during the machine operation, due to safety at work aspects. This poses a problem to operators, since it should be possible to monitor fabric wear even under conditions other than during a shutdown.

SUMMARY OF THE INVENTION

The object of this invention is to provide a method, a system, a rotating machine element and a computer program product, which can be used to improve the safety at work in a fiber web or a paper finishing machine while monitoring the condition of a continuous element, more specifically a fabric, moving in the machine. The characteristic features of the method, the system, the rotating machine element and the computer program product according to the invention are set forth, respectively, in claims 1, 16, 20 and 21.

In the method, the fabric is installed in a fabric run, wherein it moves via a machine element equipped with a sensor assembly, a reference profile is formed for the tension profile of the fabric formed between the rotating machine element and the fabric after installing the fabric in the fabric run, the tension profile, formed from the measurement signal, of the fabric formed between the machine element and the fabric and the reference profile are compared, and information is produced from this comparison for monitoring the condition of the fabric. The comparison provides information about the condition and quality of the fabric. Owing to the formed reference profile, it is possible to identify a change in the fabric condition already at an early stage, monitor its development, make the condition change and the related information available for the machine control system or known to the operator, and perform actions regarding the fabric. Thus, the invention also improves safety at work. Owing to the reference profile and the comparison made relative thereto, it is possible to determine the condition of the fabric without the operator having to go near it in order to take manual measurements. Furthermore, the invention enables easy and quick observation of the response caused to the fabric condition and quality by the actions taken.

According to an embodiment, the sensor assembly, with which the cross-directional profiles of force or pressure are formed, may include one or more sensors installed on the shell and/or the cover of the machine element. The sensor may measure force or pressure directly or indirectly. Owing to the sensor assembly, the fabric condition can be monitored even with measurement arrangements that already exist in the machine element, this taking place surprisingly by utilizing a cross-directional profile measurement of the nip between the machine element and the fabric, for example. In other words, with the invention it is possible to diversify the purpose of use of an existing sensor assembly in a surprising way without major installation or modification work. If the machine element is already equipped with a sensor assembly for measuring the cross-directional profile of nip force of a nip, for example, the method according to the invention can even be a merely program-based implementation in the machine control automation. In this case, it is very simple to implement.

Some examples of moving continuous elements include fabrics, already referred to above, as well as rolls formed from the web. By applying the same principle, it is also possible to provide monitoring methods for parent rolls and shipping rolls, which do not involve dangerous working methods during the machine operation or other work safety risks while taking the measurements. Correspondingly, work safety related to fabric condition monitoring also improves, as it can also be performed utilizing the method. Other advantages of the invention are that the systems are automated and real-time. Other additional advantages achieved with the method, system and computer program product according to the invention become apparent from the description, and the characteristic features are set forth in the claims.

BRIEF DESCRIPTION OF THE DRAWINGS

The invention, which is not limited to the embodiments set forth below, is described in more detail by making reference to the appended drawings, in which.

DESCRIPTION OF THE PREFERRED EMBODIMENTS

Figure 1:
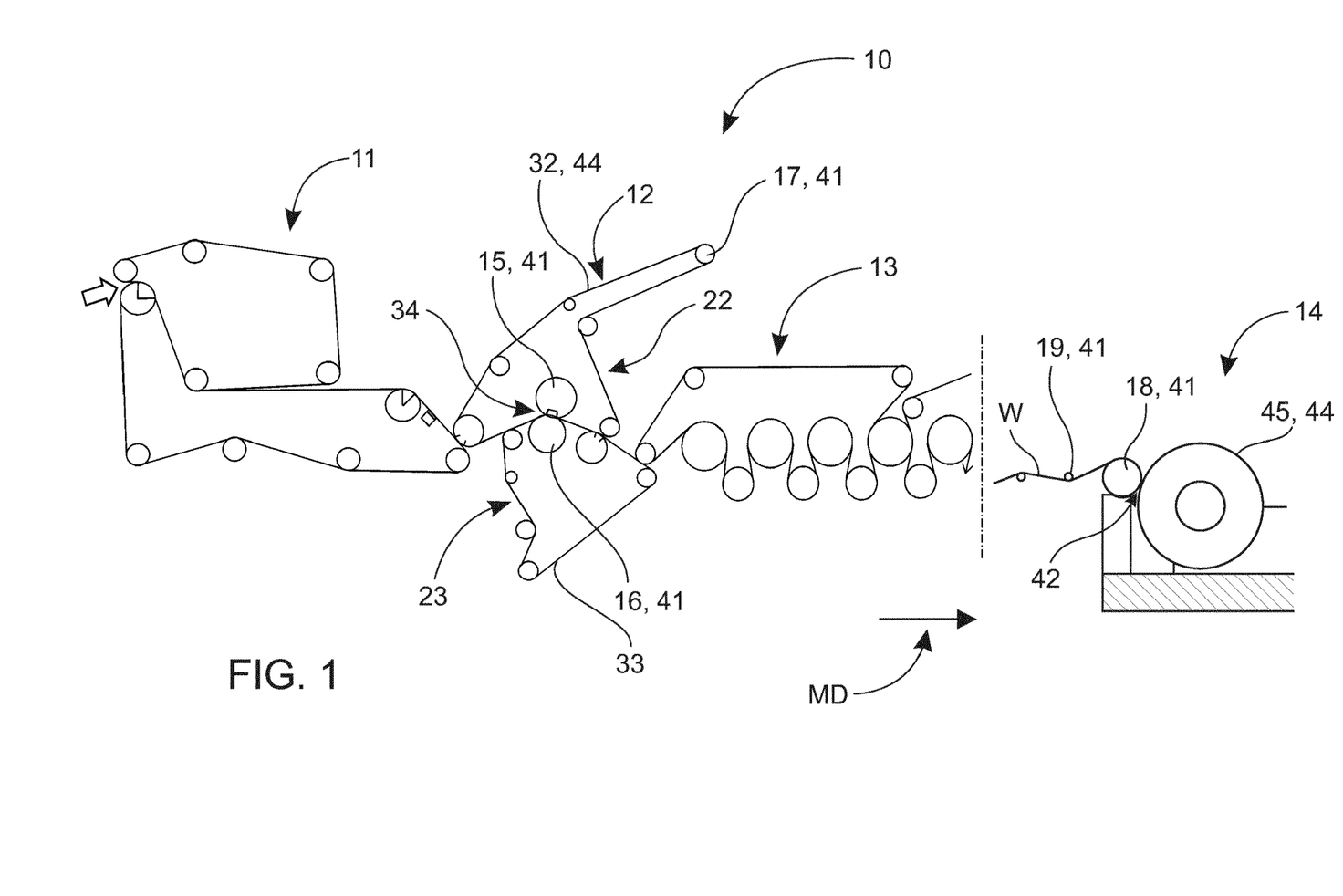
FIG. 1 shows a rough diagrammatic view of one example of a fiber web machine and a reel.

Referring more particularly to FIGS. 1-8:

FIG. 1 is a rough diagrammatic view of one example of an embodiment of the invention, which in this case is a fiber web machine 10. In addition to a fiber web machine, the invention can also be utilized in a paper finishing machine, for example. Some examples of these may include slitting, calendering, coating, surface sizing and rewinding. A fiber web or paper finishing machine includes one or more sub-entities 11-14. A fiber web machine may include the following as subsequent sub-entities (FIG. 1 from left) located in the web travel direction, i.e. in the machine direction: headbox (not shown), web forming section 11, press section 12, dryer section 13, one or more possible finishing devices (not shown), and reel 14. A finishing device may be an integral part of the machine line (online) or a separate sub-entity of its own (offline). Other components may of course exist between parts 11-14. Thus, the order set forth is not intended to limit the invention in any way. For example, after the dryer section 13, calendering, coating, surface sizing and/or after-drying can take place, these being mentioned in this context merely as a few examples prior to the reel 14.

At least some of the sub-entities 11-14 of the fiber web machine 10 have one or more rotating machine elements 41. Some examples of rotating machine elements 41 are rolls and cylinders 15, 16, 18, 19 that are in contact with or otherwise indirectly influence the web W. At least one fabric 32, 33 may be arranged to travel via rolls and cylinders 15, 16, such as is the case with sub-entities 11-13, for example. Fabrics 32, 33 rotate in fabric runs 22, 23. In addition to rolls and cylinders, fabric runs 22, 23 are defined by lead rolls 17, which belong to rotating machine elements 41. Via these, the fabric 32, 33 is set to travel in the fabric run 22, 23 arranged for it. A sub-entity 14 may also be without a fabric run. This is the case in the exemplifying embodiment related to the reel, i.e. sub-entity 14. In this case, the machine elements 18, 19, i.e. rolls, are in direct contact with the web W. In some positions, the contact of the web W with a rotating machine element and/or a fabric can be one-sided only.

At least in some of the sub-entities 12, 14 of the fiber web machine 10, the machine element 41 is set against a moving continuous element 44. According to a first embodiment, the moving continuous element 44 may be a fabric 32, 33 installed in the fabric run 22, 23 traveling via a machine element 41. Thus, according to the first embodiment, the machine element 41 can define the fabric run 22, 23. In this case, the rotating machine element 41 equipped with a sensor assembly 24 can be one or more lead rolls 17 of the fabric run 22, for example. Via the lead roll 17, the fabric 32 rotates i.e. moves in the fabric run 22 supported at the wrap angle selected thereto. According to another embodiment, the machine element 41 does not necessarily need to define, i.e. be part of the fabric run 22, 23. In this case, the fabric only travels via it in production conditions, for example. This may be the case, for example, in a press nip 34 in the press section 12.

According to a third embodiment, the machine element 41 can also be a reel drum 18 of a reel 14. In this case, the moving continuous element 44 is a roll 45 formed from the web W. A moving roll 45, the movement thus being a rotating movement, is formed on the opposite side of the web W relative to the reel drum 18. The reel drum 18 forms, in a manner known per se, a reel nip 42 together with the roll 45 formed from the web W. In this case the reel drum 18 and/or the roll 45 can be loaded in a manner known per se against each other. Generally, the moving continuous element 44 can also be called an object element or an object, or even more specifically, a moving object element or a moving object.

Figure 2:
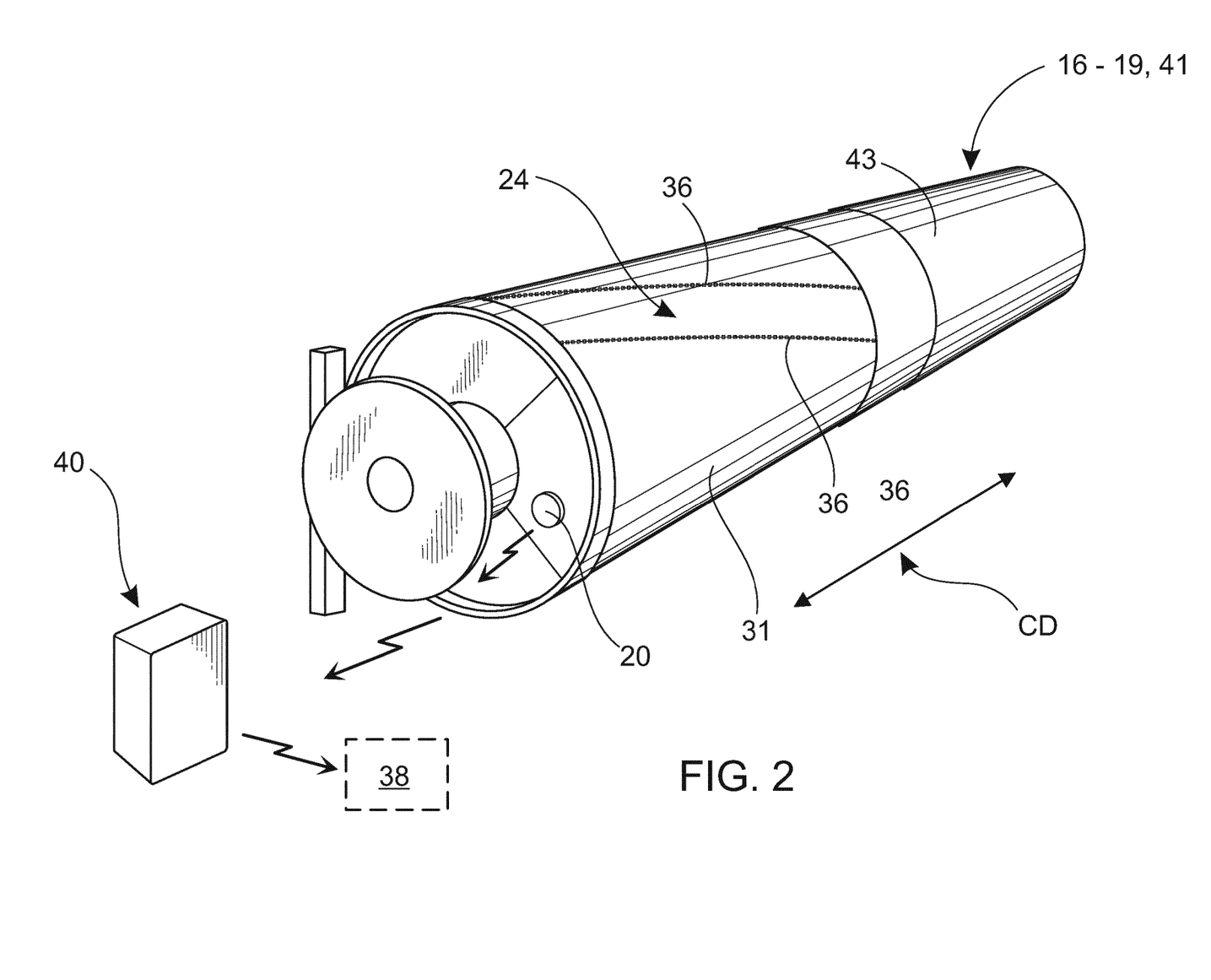
FIG. 2 shows an example of a machine element equipped with a sensor assembly, which can be utilized in the invention.

FIG. 2 shows an example of a rotating machine element 41. For example, the machine element 41 may be a lead roll 17 that defines the fabric run 22 in some position of the fiber web machine 10, a nip roll 16 that forms, i.e. is included in a press nip 34, a reel drum 18 located at the reel 14, or a web roll 19 preceding the reel 14. However, the machine element 41 does not necessarily need to define, i.e. participate in defining a fabric run 22, 23. In this case, it can be said that the fabric 32 only travels via it. For instance, this may be the case in the press section 12, where the fabric 32, for example, travels via the press nip 34, wherein the second machine element 41 is a nip roll 16 equipped with a sensor assembly 24. Thus, it can be said that two fabrics 32, 33 travel via the nip roll 16. The nip roll 16 defines, i.e. is part of the fabric run 23, wherein the fabric 33 now travels. The machine element 41 is equipped with a sensor assembly 24 measuring force or pressure. The sensor assembly 24 can be composed of any sensors that measure pressure or force directly or indirectly. By way of example, these may include piezoelectric sensors, piezoceramic sensors, piezoresistive sensors, force sensitive FSR sensors, capacitive sensors, inductive sensors, optical sensors, electromechanical film sensors, etc., which have a sufficient resolution for producing desired information. The sensor assembly 24 may be formed of a sensor band 36 or a set of sensors formed of one or more discrete sensors 36.

According to an embodiment, the sensor assembly 24 may be based on, for example, an electromechanical film sensor 36 known per se. One or more film sensors 36 may be arranged on the roll shell 31 and/or cover 43. An example of such a diaphragm sensor 36 are sensors known with the trade name EMFi. Other sensors made of film-like materials operating according to a similar principle can also be applied, such as PVDF sensors. More generally, these can be referred to as pressure sensitive film sensors. The sensor assembly 24 may typically be installed on the surface of the shell 31 of the machine element 41. In this case, one or more surface layers, more generally a cover 43, are on top of it. Under or within the cover 43, the sensor assembly 24 is protected, or it can be installed between the cover layers.

Sensors 36 can be disposed on the shell 31 and/or the cover 43 of the machine element 41 in a rising manner, as is shown in FIG. 2. The sensor assembly 24 may also be disposed on the shell 31 and/or the cover 43 of the machine element 41 in a circumferential direction. In that case the sensors may be disposed uniformly distributed on the roll shell 31 at a distance from each other. In this case, an area free of sensors remains between them. When disposed in a rising manner, the sensors rotate around the shell 31 of the machine element 41 in a spiral fashion at a distance from each other. The angle of rotation of the sensors 36, more generally, of the sensor assembly 24, on the shell 31 of the machine element 41 may range between 180 and 320 degrees, for example. The machine element 41 may be provided with data transfer means 20 known per se for delivering a measurement signal 25 generated by the sensor assembly 24 to condition monitoring 38 included in the machine control automation. For example, this can be implemented with a transmitter provided at the roll end. With it, the measurement signal 25 is delivered to a receiver 40 disposed outside the roll. The receiver 40 may also be provided with a delivery feature for delivering the measurement signal 25 further to the machine control automation, to reception means 46 arranged therein.

Figure 3:
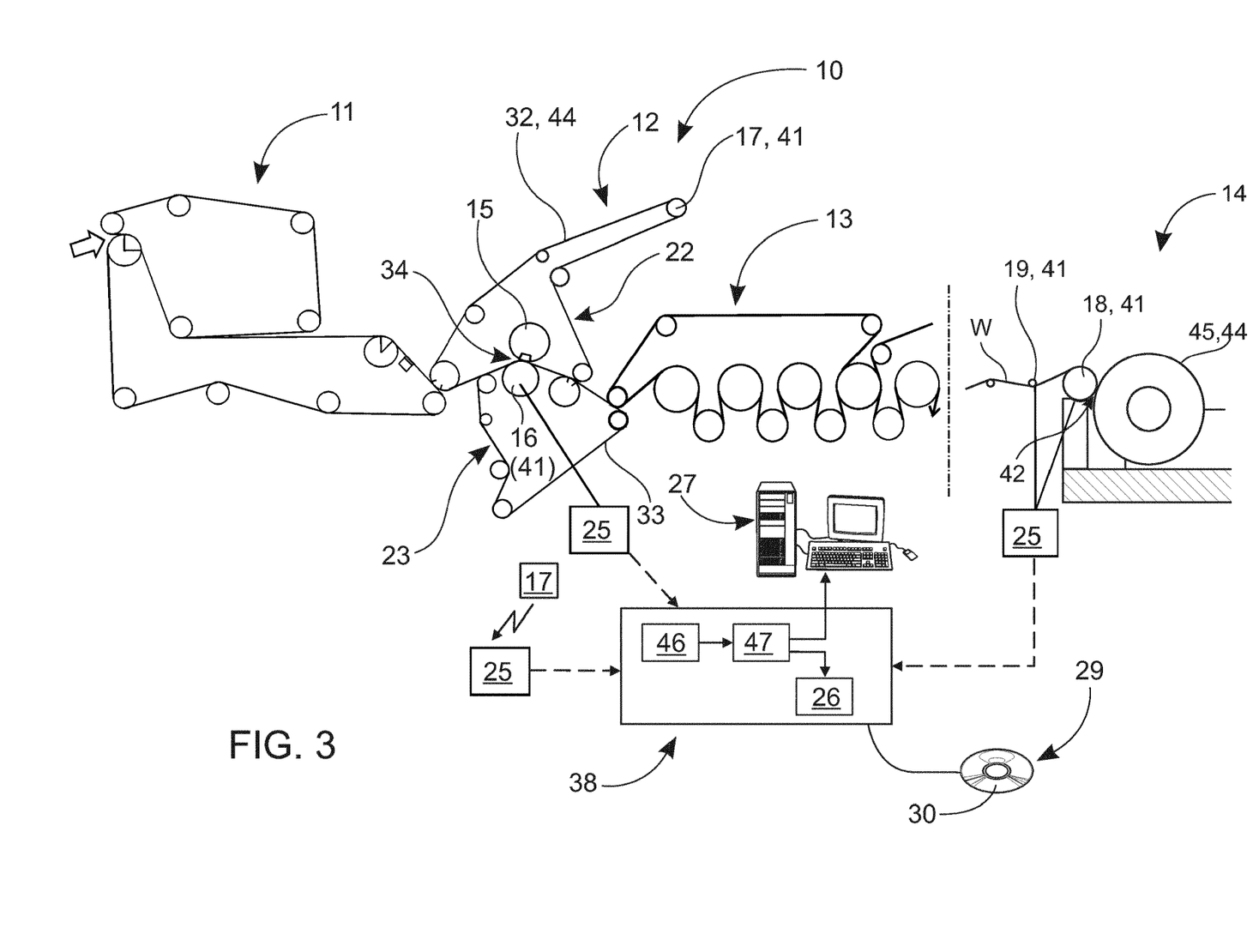
FIG. 3 shows a rough diagrammatic view of a fiber web machine of FIG. 1 and a condition monitoring system included therein.
Figure 4:
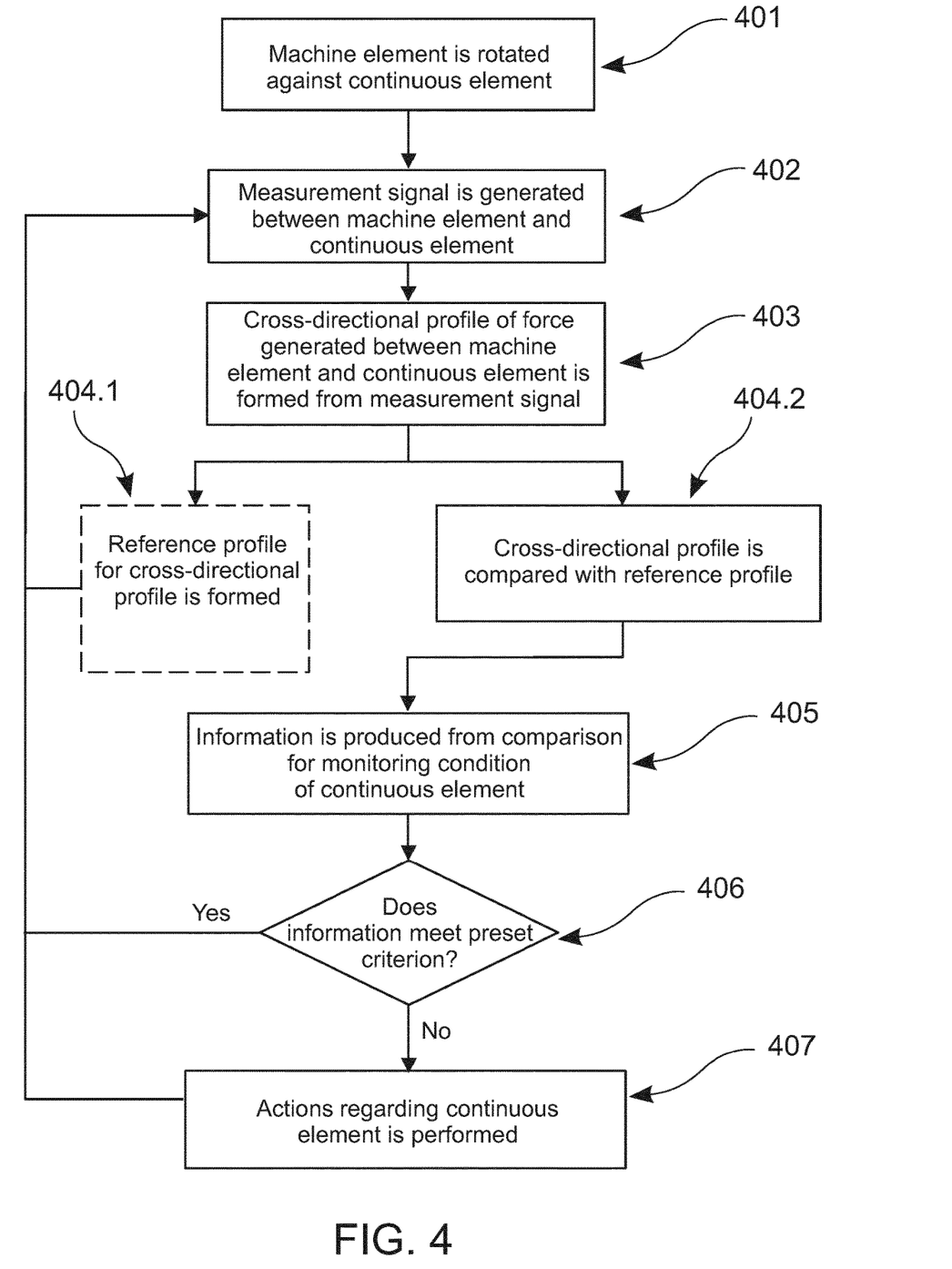
FIG. 4 shows a flowchart view of an example of the method according to the invention at a general level.

The method for condition monitoring of a continuous element 44, more specifically a fabric 32, 33, moving in a fiber web or paper finishing machine is described below in more detail as an exemplifying embodiment referring to FIGS. 3 and 4. FIG. 3 illustrates the fiber web machine 10 of FIG. 1 and condition monitoring 38 connected thereto, and FIG. 4 is a flowchart view of the method at the general level. The condition of a moving continuous element 44 is monitored with a rotating machine element 41. For example, as shown in FIG. 2, a sensor assembly 24 measuring force or pressure is disposed on the shell 31 and/or the cover 43 of the machine element 41. Thus the fabric 32, 33 now moves against the machine element 41.

As step 401 of the method, the machine element 41 equipped with a sensor assembly 24 is made to rotate against a moving continuous element 44, more specifically a fabric 32, 33. The machine element 41 equipped with the sensor assembly 24 may be, for example, a lead roll 17 included in the fabric run 22, 23 and/or a nip roll 16 included in the press nip 34.

As step 402 of the method, a measurement signal 25 is generated between the machine element 41 and the moving continuous element 44, more specifically the fabric 32, 33, with the sensor assembly 24 arranged in the machine element 41. The measurement signal 25 formed with the sensor assembly 24 is proportional to force or pressure generated between the machine element 41 and the fabric 32, 33. This force or pressure may vary in the cross direction (CD) of the machine, i.e. in the longitudinal direction of the machine element 41.

The measurement signal 25 generated with the sensor assembly 24 can be stored. As step 403, a cross-directional profile 21 of force or pressure generated between the machine element 41 and the moving continuous element 44 is formed from the measurement signal 25. In the case of a fabric 32, this can also be referred to as the tension profile 21.1 of the fabric 32.

The cross-directional profile 21 of force or pressure, more specifically the tension profile 21.1 of the fabric 32, formed in step 403 can be utilized in step 404, which can include two steps 404.1, 404.2 at least partially in a parallel manner. As step 404.1, a reference profile 35.1 is formed for the cross-directional profile 21; thus, in this case for the tension profile 21.1 of the fabric 32, using the measurement signal 25. This can take place, for example, mainly immediately after installing the fabric 32 in the fabric run 22 and/or when it is determined that the fabric 32 operates in a way optimal for it. In this way, it is possible to know the tension profile 21.1 of the fabric 32 as new and thereby in a perfect operating condition. Thus, it is also possible to speak of an essentially new fabric 32 and the related reference profile 35.1. For example, the reference profile 35.1 is formed by collecting the measurement signal 25 over a relatively long period that is known to be good as regards the operation of the fabric 32, and by calculating the average of it. Thus, the collection of the measurement signal 25 and the formation of the reference profile 35 may be mainly continuous-time.

The formation of the reference profile 35 can also take place with preset periods. The reference profile 35 is characterized by a preset type of constancy and quality as regards the moving continuous element 44 that is the target. The aim is to form a reference profile 35 when the operating conditions of the fiber web machine 10 and/or the operation of the component of interest are known to be mainly optimal and production is known to take place mainly without disturbances. As regards the fabric 32, its operation can then be said to be optimal without any phenomena affecting its ageing. In that case the measurement signal 25, from which the reference profile 35 is formed, is as free as possible of disturbances and phenomena related to ageing. In addition, it is also characteristic of the formation of the reference profile 35 that it takes place in acceptable operating conditions as regards the condition/quality of the moving continuous element 44. The reference profile 35 of force or pressure between each machine element 41 and the related moving continuous element 44 is stored in the machine control automation for use. The reference profile 35 is used to analyze a momentary cross-directional profile 21 formed in a position corresponding to the reference profile 35, which can be performed as step 404.2 in parallel with step 404.1.

As step 404.2 of the method, the cross-directional profile 21 formed from the measurement signal 25 and representing force or pressure generated between the machine element 41 and the moving continuous element 44, more specifically the fabric 32, 22, here more specifically the tension profile 21.1 of the fabric 32, is compared with the reference profile 35.1 already formed for it earlier in step 404.1. The cross-directional profile is here measured directly, i.e. immediately between the machine element 41 and the fabric 32, 33 (at lead roll 17 and nip roll 16). The measurement of the cross-directional profile can also be indirect. This is the case, for example, in the embodiment related to a press nip 34, set forth somewhat later in the description. In that there may be another fabric 33 between the nip roll 16, equipped with a sensor assembly 24, and the fabric 32.

Thus, the purpose of the comparison, performed as step 404.2, is to identify variation in the cross-directional profile 21 of force or pressure, more specifically the tension profile 21.1 of the fabric 32, relative to the reference profile 35. More precisely, this comparison may be a mutual comparison of a momentary cross-directional profile 21 and a reference profile 35 formed over a longer period for identifying variation, a difference or an equivalent change in accordance with a preset criterion in the cross-directional profile 21 relative to the reference profile 35. A variation, difference or change indicates a change in the condition or quality of the moving continuous element, more specifically the fabric 32.

As step 405, information 37, particularly visual information, is produced from the comparison for monitoring the condition of the moving continuous element 44, more specifically the fabric 32, 33. More specifically, the comparison can be used to produce visual information 37 regarding the level of variation, difference or equivalent change determined in the cross-directional profile 21 and its point of manifestation in the cross-machine direction (CD).

Figure 5:
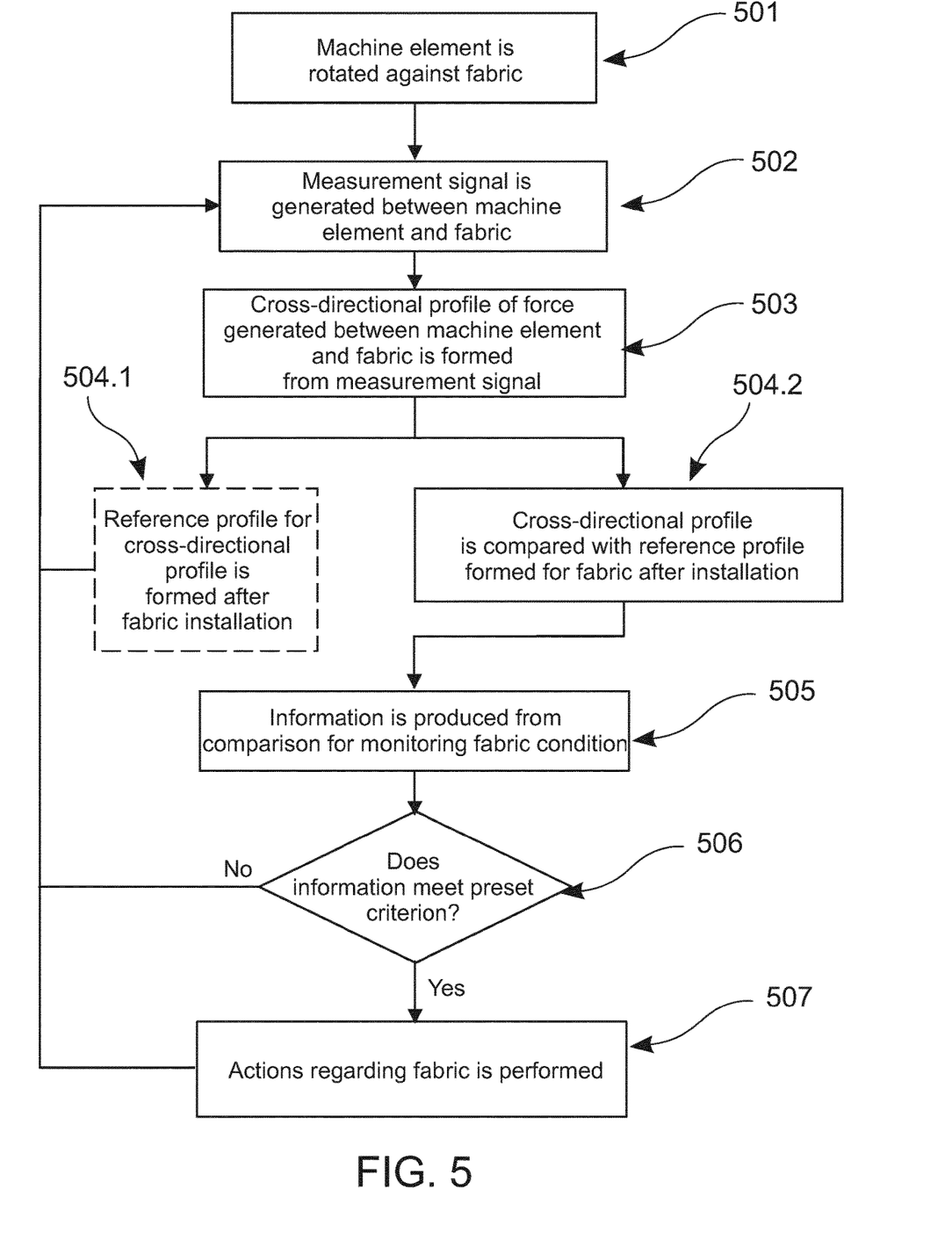
FIG. 5 shows a flowchart view of an example of the method according to the invention for monitoring the fabric condition.
Figure 6:
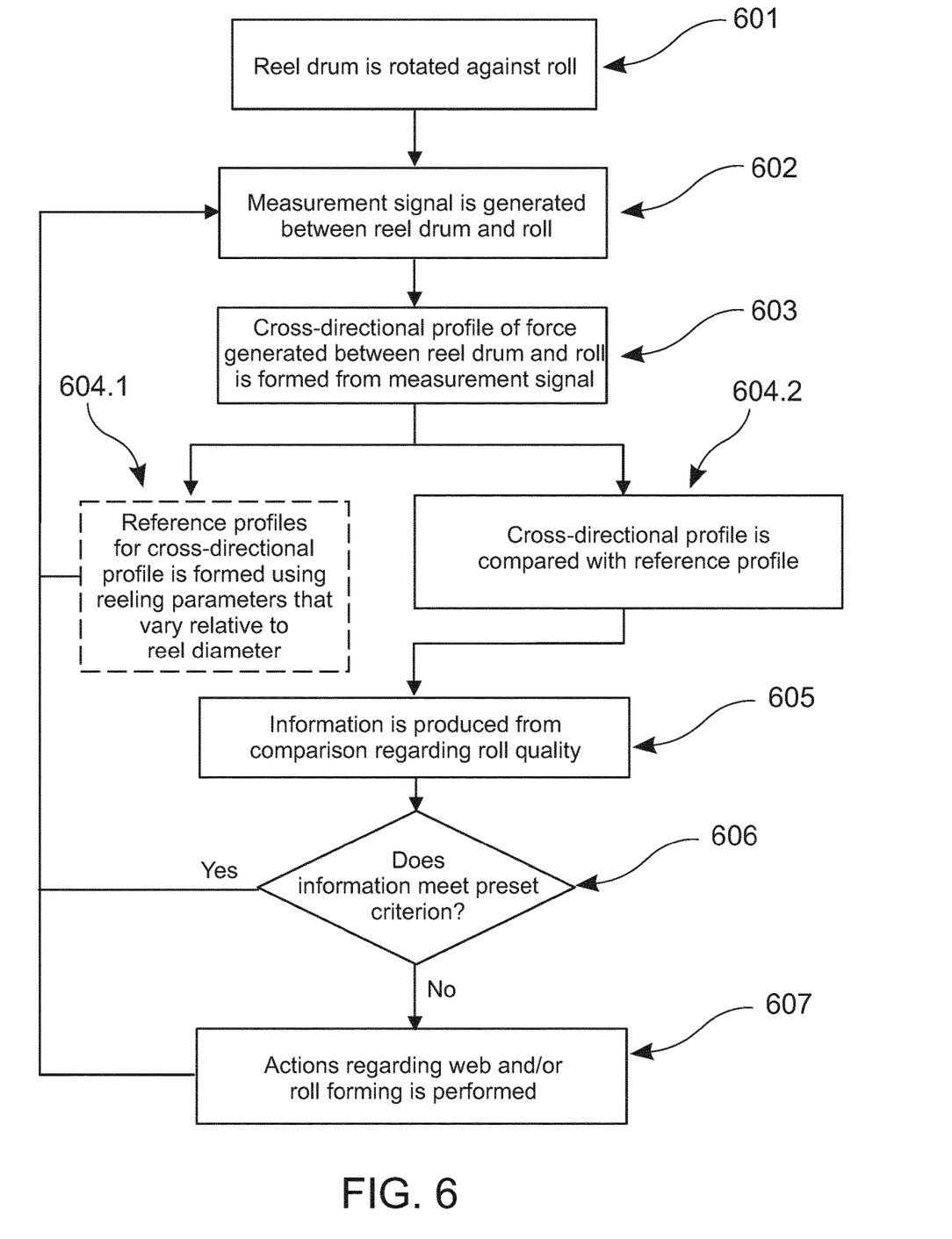
FIG. 6 shows a flowchart view of an example of the method according to the invention for monitoring the condition of a roll to be formed at a reel.

If it is determined in step 406 that a variation, difference or change in accordance with the preset criterion was found, it is possible to proceed to step 407 for performing actions regarding the condition or quality of the continuous element 44, more specifically the fabric 32. Along with these actions, or if changes in accordance with the preset criterion were not identified in step 406, the execution of the method is continued. The method can be executed as a parallel continuous loop at least regarding the comparison. The generation of the reference signal 35, i.e. step 404.1, may be periodic in accordance with the preset criterion. For example, it can be performed for a newly introduced moving continuous element 44 (FIG. 5, fabric). On the other hand, it may also take place as a specific calibration run. In this case, the reference profile 35 is formed according as the condition of the moving continuous element 44 changes (FIG. 6, reeling).

Figure 7:
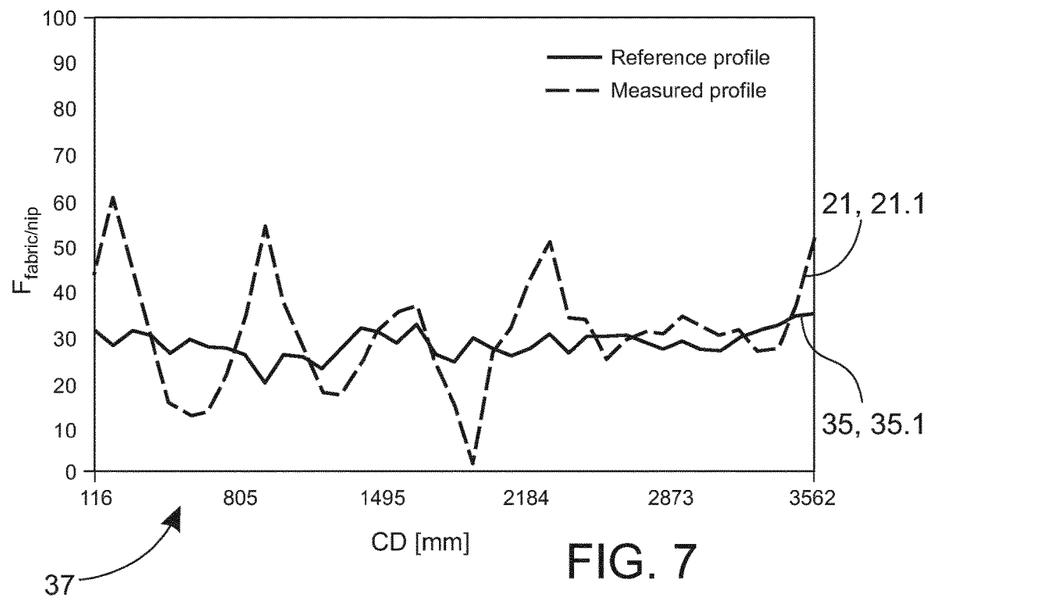
FIG. 7 shows a basic view of information produced from profile measurement data for monitoring fabric condition.

FIG. 5 is a flowchart view of an example of a method according to the invention for monitoring the condition of the fabric 32, whereas FIG. 7 illustrates, at a general level, information 37 produced from profile measurement data for monitoring the condition of the fabric 32. Thus, the continuous element 44 is now the fabric 32 installed in the fabric run 22 defined by the machine element 41, a lead roll 17 in this case. Correspondingly, the cross-directional profile 21 of force or pressure is the tension profile 21.1 of the fabric 32, of which a basic example is shown in FIG. 7. The same flowchart and principle would also be applicable to the condition monitoring of a fabric performed at a roll nip, such as a press nip 34, as is explained somewhat later. In this application of the method, the sub-steps are mainly similar to those already described in FIG. 4. The reference profile 35.1 is now formed for an essentially new fabric 32. Before forming it, the fabric 32 is installed in the fabric run 22, wherein it moves via a machine element 41, in this case a lead roll 17, equipped with a sensor assembly 24. The steps 501-503 can be corresponding in principle to what is set forth in FIG. 4. As step 504.1, a reference profile 35.1 is formed for the tension of an essentially new fabric 32. This may be performed mainly immediately after installing the fabric 32 in the fabric run 22. In some cases, however, the fabric 32 may be allowed a running-in period, relatively short in relation to the entire life of the fabric 32, before forming the actual reference profile 35.1. In that the fabric 32 will achieve the optimal operating condition designed for it. Thus, in this context the definition "essentially new fabric" may be understood as fabrics of the aforementioned kind, for example.

According to an embodiment, a differential profile of the fabric 32 can be formed in the comparison performed as step 504.2. The differential profile is obtained when the stored reference profile 35.1 is deducted from the real-time tension profile 21.1 measured continuously during production. In this case, the profile measurement of fabrics 32 and comparison takes place automatically and during production and does not require a shutdown. In addition, the operator does not need to enter dangerous conditions going inside the machine to perform the aforementioned observation. The computed differential profile can be used to form indices, for example, representing the condition of the fabric 32. Indices formed as step 505 can be displayed as trends, for example.

In this way, it is possible to easily see any changes taking place over time in the condition of the fabric 32.

One or more indices representing the condition of the fabric 32 can be formed. At least one of the following can be formed as indices: excessive deviation of the differential profile, excessive deviation of the real-time tension profile 21.1, excessive peak-to-peak variation of the differential profile and/or too high/low an individual value in the tension profile 21.1. These can be displayed as trends, for example, in the control room user interfaces.

As information 37, it is possible to produce a real-time production-time tension profile 21.1 of the fabric 32 and, in addition thereto, the aforementioned computed differential profile, in which the mainly real-time tension profile 21.1 has been deducted from the reference profile. These can be displayed in the control room, for example, as profile displays or a color chart and/or a waterfall plot on the operator display panels. From these, it is easy to see how the tension profile 21.1 of the fabric 32 has changed since new. Based on the indices, an alarm can be given when values start to approach alarm limits. When the limit is exceeded, an alarm is given.

The development of the indices can also be compared with corresponding measurements taken and stored during the life of earlier fabrics. The comparison can be made manually or automatically. Based on the comparison, alarms can be activated, for example, when the indices approach values that are based on empirical information, which indicate the fabric 32 reaching its end of life. In that case it is possible to learn to alarm even automatically more accurately when the values start to approach such values that indicate the fabric 32 reaching its end of life (values measured before the change of earlier fabrics represent the condition of an end-of-life fabric). Thus, it is possible to schedule, in a controlled manner, the correct point of time for the replacement of the fabric 32.

The aforementioned aspects are analyzed as step 506 either automatically by condition monitoring or by the operator. If the preset criterion is met, reconditioning actions regarding the fabric 32 can be taken as step 507, or the fabric 32 can be replaced with a new one if determined that it has finally reached its end of life.

In addition, as step 506, it is also possible to compare the difference of tension profiles 21.1 following each other temporally, i.e. successive tension profiles. If a change is determined in these, a sudden fabric failure, for example, can be identified based on it. The system can learn to identify sudden fabric failures, for example, by examining the difference between adjacent measurements of the tension profile: an excessive difference represents a failed point that has emerged in the fabric. The tension profile and its trend also show other things, which indirectly affect the operation and lifecycle of fabrics. For example, these include the performance of stretchers and guides and the total tension of the fabric 32.

With the aforementioned method, changes in the mechanical condition of the fabric 32 are identified. According to another embodiment, another reference profile 35 can be formed for the fabric 32, 33 (in addition to or instead of the tension profile measurement) by measuring the cross-directional profile of nip pressure of a loadable press nip 34 formed between two rolls 15 and 16. The press nip 34 is formed, in a manner known per se, by two rotating rolls 15, 16 that are placeable and loadable against each other, with at least one fabric 32, 33 traveling between them. At least one of the rolls 16 is equipped with a sensor assembly 24. In this case, the fabric run 22, 23 includes at least one press nip 34. As the design and principle of operation of the roll nip and the rolls 15, 16 included in it are known per se for those skilled in the art, it is not necessary to explain them more profoundly in this context. At a roll nip, water is removed from the web that passes through the roll nip. Since roll covers wear off slowly, a change in the nip load profile visible over the change interval of the fabric 32, 33 is mostly due to wear/compacting/soiling of the fabric 32, 22 passing via the press nip 34. In the press, the machine element 41 can define the fabric run 22, 23. However, it should also be noted that in the press, the machine element 41 does not always necessarily need to define, i.e. be part of the fabric run 22, 23. In this case, the fabric 32 only travels functionally via the machine element 16, as is the case in the press nip 34, for example.

This measurement and the formation of the reference profile can also be performed mainly immediately after the installation of the fabric 32, 33. In some cases, however, the fabric 32, 33 may even here be allowed a running-in period, relatively short in comparison with the entire life of the fabric 32, 33, before forming the actual stabilized reference profile 35.1. The real-time cross-directional profile of the press nip 34 continuously formed at each point in time is compared with the reference profile 35.1 formed with the new fabric 32, 33 for determining the change caused by the wear of the fabric 32, 33. According to an embodiment, in the comparison is formed a differential profile for the cross-directional profile of the press nip 34 and the reference profile 35.1 formed for it. Based on the differential profile, indices, for example, are faulted for the condition of the fabric 32, 33, which are then displayed as trends, for example.

In the same way as for the fabric tension in the embodiment set forth above, here, too, at least one of the following can be formed as indices for the condition of the fabric 32, 33: deviation of the differential profile, deviation of the real-time cross-directional profile of the press nip 34, peak-to-peak variation of the differential profile and/or too high/low an individual value in the cross-directional profile of the press nip 34. In addition, as information 37, it is possible to produce a cross-directional profile and a differential profile of the press nip 34, which can be displayed as profile displays, a color chart and/or a waterfall plot, for example.

The invention brings forward the change caused by the wear of the fabric 32, 33, and again, limit values can be defined for this, according to which the wear of the fabric 32, 33 is identified and its replacement interval can be optimized. It is also possible to examine the set-up of a new fabric 32, 33 via a nip profile and tension profile measurement. The sub-steps of the method can be similar to those with the lead roll 17, except for that in this case, a rotating machine element 41 equipped with a sensor assembly 24 is naturally one of the rolls 16 in the press nip 34. For example, this measurement can be used to examine blocking and wearing of a fabric 32, 33.

Figure 8:
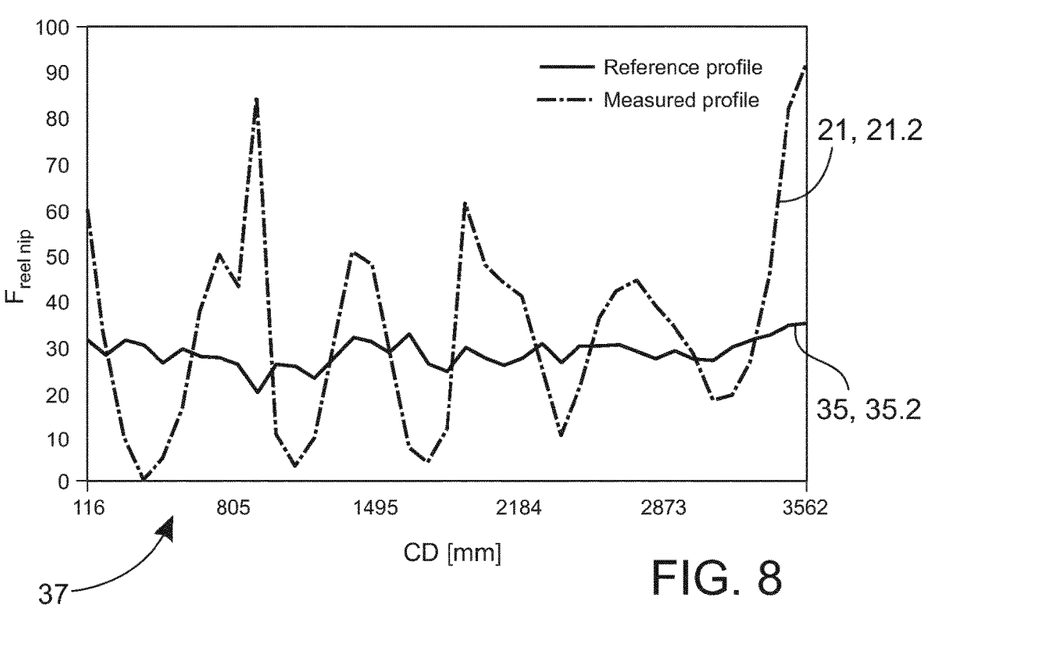
FIG. 8 shows a basic view of information produced from profile measurement data in roll formation.

FIG. 6 is a flowchart view of an example of a method according to the invention for monitoring the condition of a roll 45 formed in a reel 14, and FIG. 8, in turn, illustrates at a basic level information 37 produced from profile measurement data in roll forming. In this embodiment, the machine element 41 is thus a reel drum 18, while the continuous element 44 is a roll 45 to be formed from the web W. The roll 45 is formed on the opposite side of the web W relative to the reel drum 18.

Steps 601 and 602 may correspond to those described above regarding their basic principles. The cross-directional profile 21 to be formed, i.e. in this case the linear load profile formed at the reel drum 18 between the reel drum 18 and the roll 45 to be formed from the web W corresponds to the hardness profile 21.2 of the roll 45. As step 602, at the reel 14, a load trend in the machine direction MD of the nip 42 between the reel drum 18 and the roll 45 is additionally formed at the reel drum 18. For both of these, reference profiles 35.2 are formed in step 604.1 using reeling parameters that are different relative to the diameter of the roll 45.

In addition to the above measurements, the tension profile and the tension trend in the machine direction MD of the web W arriving at the reel 14 can be measured at the web roll 19 preceding the reel drum 18, more generally the reel 14. This gives a tightness profile for the roll 45.

The hardness profile and the tension profile of the reel 14 are displayed to operators in the control room. Then it is not necessary to measure the profiles of the rolls 45 by going between the rails of the reel 14. The web tension level and the reel 14 nip load level, which are seen from the above measurements, determine the tightness of the roll 45 relative to the diameter. The hardness profile and the tension profile, as well as the nip load of the reel 14, determine the profile of the tightness of the forming roll 45 and how uniform the roll 45 is. These values defined with the sensor assembly 24 can be displayed to operators as profiles, trends and combined hardness indices, for example. In addition to these, other quality parameters of paper can be used for support. For example, in addition to the nip load and web tension, the effect of paper friction and permeability can be included—the higher the permeability or friction, the smaller the value needed for the web tension and the nip load.

As step 605, a trend representing the tightness of the roll 45, which can be displayed in the control room, is produced as information from the different machine directional MD parameters and/or indices formed based on the comparison, representing their combined effect. This can be used to search deviations in accordance with a preset criterion, and when such is found, an alarm can be given as step 606. In that case the operator, as step 607, can assess the need of tightening reeling parameters and carry out the necessary actions.

As step 605, a quality index can also be produced as information for cross-directional hardness profiles 21.2, tension profiles and their combination. This can be displayed as a trend, and an alarm can be activated when detecting an excessive change or an extreme value in the trend, for example. A quality index can be formed, for example, based on deviation, peak-to-peak variation and/or differences between the edges of the roll 45 and the center area. This index can be displayed in the control room as a trend, for example, and again, excessive variations or extreme values in the trend may trigger an alarm, based on which the operator can carry out profile improving actions as step 607. For example, if there is a hard hump at the roll edge, the operator can first check whether edge trimming operates adequately, and if this is the case, then increase calendar load at the edges and/or profile the basis weight downwards.

The development of indices relative to the roll 45 diameter can be compared (manually or automatically) with corresponding measurements taken during the production of already completed rolls and indices and their development. Thus, it is possible to learn to alarm even automatically more accurately when the values start to approach such values that require operator actions. Indices can then be analyzed in order to identify risks of sudden damaging of the roll 45. The system can also learn to identify risks of sudden damaging of the roll 45, for example, by examining the difference between adjacent hardness measurements: an excessive difference represents a risk for structural damage of a parent roll. Correspondingly, an excessive difference in the tension profile represents a risk for a web break.

Limit values between the alarm limits for different parameters/indices can be determined by measuring the rolls 45 with different reeling parameters and by examining their quality with traditional methods. In other words, in this case, automatic measurements/indices/alarms are calibrated to represent the same as operators have earlier performed according to the prior art.

At the reel 14, the method can also be used to identify excessive vibration of parent/shipping rolls and to also alarm of these.

In turn, FIGS. 7 and 8 show graphs of cross-directional profiles 21.1, 21.2 for applications shown in FIGS. 5 and 6. It will be evident for those skilled in the art that the shapes of the profiles can in reality vary even greatly from these. The position axis, i.e. the positions on the shell 31 of the machine element 41 in the cross-machine direction CD, is shown in the horizontal direction, and the force axis is shown in the vertical direction. In FIGS. 7 and 8, the reference profile 35.1, 35.2 is drawn with a continuous line. It represents the cross-directional profile in conditions where the tension of the fabric 32 and/or the cross-directional profile of force of the press nip 34 at the fabric 32 is as desired (FIG. 7) and the hardness and tightness of the roll 45 to be formed are as desired (FIG. 8). The reference profile 35.1 can have been formed immediately after the installation of the fabric 32. The reference profile 35.2 can have been formed on a roll or a set of rolls of an equivalent grade that is known to be good. In addition, instead of one profile, the reference profile 35.2 may be a set of profiles that considers the diameter growth of the roll 45. In other words, as the diameter increases while forming the roll 45, the reference profile 35.2 used in the comparison will also change.

The cross-directional profiles 21.2, 21.2 drawn with broken lines in FIGS. 7 and 8 illustrate the mainly real-time profile measured on the machine element 41. FIG. 7 can represent, at a basic level, a tension measurement of a fabric 32 on a lead roll 17 and/or a cross-directional profile measurement of nip pressure of a press nip 34. In the case of a fabric 32, this could be a situation where the tension measured at the lead roll 17 of the fabric 32 is uneven, which leads to problems in its operation. On the other hand, in the case of a fabric 32, this could also be a situation where the fabric 32 has become locally compacted, which also leads to problems in its operation. In this case, the measurement is made at the press nip 34. Correspondingly, in the case of the roll 45 shown at a basic level in FIG. 8, this could be a situation where the hardness and/or tightness of the roll 45 shows unevenness. These manifest a problem related to roll forming and/or web forming.

These mainly real-time measured cross-directional profiles 21.1, 21.2 clearly show the difference relative to the reference profiles 35.1, 35.2 formed. The comparison of the measured cross-directional profiles 21.1, 21.2 with the reference profiles 35.1, 35.2 can be carried out online, mainly automatically. In this case, the measurement signal 25 shows whether the measured profile changes, and if it does, the type of the change.

Detection of variations, differences and changes from the profiles and, for example, indices formed therefrom, more generally the comparison, can be performed mainly continuous-time. Information 37 can be further processed compared to mere profiles. For example, it can include different kind of indices, trends and tables. Information 37 can be published on the display panel 27 of the information system 38 specifically to each position at predefined intervals or at user-defined intervals, for example.

In addition to a method, the invention also relates to a system for monitoring the condition of a continuous element 44, more specifically a fabric 32, moving in a fiber web or paper finishing machine. Condition monitoring is arranged to be performed with a rotating machine element 41, which is equipped with a sensor assembly 24 that measures force or pressure. The moving continuous element 44 is arrangeable to move against the machine element 41. The system includes a sensor assembly 24 that measures force or pressure and is disposed on a shell 31 and/or a cover 43 of one or more machine elements 41 for generating a measurement signal 25 between the machine element 41 and the moving continuous element 44, processing means 47, user interface means 27 and memory means 26. The processing means 47 is arranged to form a cross-directional profile 21 of force or pressure arranged to be generated between the machine element 41 and the moving continuous element 44, from the measurement signal 25. The user interface means 27 is provided for examining the cross-directional profile 21.

The continuous element 44 is a fabric 32, 33 installed in a fabric run 22, 23 arranged to travel via the machine element 41. The cross-directional profile 21 of force or pressure is a tension profile 21.1 of a fabric 32, 33 and/or a cross-directional profile of nip pressure of a press nip 34, for example. The rotating machine element 41 equipped with the sensor assembly 24 is a lead roll 17 of the fabric run 22 or a nip roll 16 included in the fabric run 23, for example. The fabric 32, 33 is arranged to travel in the fabric run 22, 23 via the lead roll 17 and/or the nip roll 16.

In the system, the measurement signal 25 formed with the sensor assembly 24 is arranged to be used to form, with the processor means 47, a reference profile 35.1 for the cross-directional profile 21 of force or pressure arranged to be generated between the machine element 41 and the moving continuous element 44, more specifically a fabric 32, 33, more specifically for the tension profile 21.1 or the fabric 32, 33 and/or for the cross-directional profile of nip pressure. The reference profile 35.1 is formed after installing the fabric 32, 33 in the fabric run 22, 23. Thus, its operation essentially corresponds to a new fabric. The reference profile 35 is arranged to be stored in the memory means 26.

In turn, the processing means 47 is arranged to compare the cross-directional profile 21 of force or pressure arranged to be generated between the machine element 16-18 and the moving continuous element 44, more specifically the fabric 32, 33, more specifically the tension profile 21.1 of the fabric 32, 33 and/or the cross-directional profile of nip pressure, with the reference profile 35.1. The purpose of the comparison is to identify variations, differences and changes in the profiles. In addition, the processing means 47 is also arranged to define the reference profile 35.1 and compute the differential profile.

In turn, the user interface means 27 is arranged to produce, for example, visual information 37 from the comparison, for monitoring the condition of the moving continuous element 44, more specifically the fabric 32, 33. The system is arranged to carry out the sub-steps of the method described above in a computer-implemented way, for example. It is also possible to add temperature, moisture and other similar sensors to the system.

The rotating machine element 41 can be arranged to define a fabric run 22. In this case, it can be a lead roll 17 of the fabric run 22, for example. On the other hand, the rotating machine element 14 can also be a nip roll 16. A nip roll 16 can also be arranged to define a fabric run 23, in which the condition of the fabric 33 traveling therein is monitored. On the other hand, the nip roll 16 can also be such, via the nip 34 of which the fabric 32, 33 is arranged to travel.

In addition to a method and a system, the invention also relates to a rotating machine element 41. It includes a shell 31, a cover 43 disposed on the shell 31 and a sensor assembly 24 installed in a spiral fashion under or within the cover 43. The machine element 41 is used in the method or system described above for monitoring the condition of a fabric 32, 33.

A rotating machine element 41 may be in the system, for example, a lead roll 17 defining the fabric run 22 and/or a nip roll 16 forming a press nip 34 and defining the fabric run 23, via which a fabric 32 belonging to a different fabric run 22 can travel.

In addition to a method and a system, the invention also relates to a computer program product 29. The computer program product 29, which may be placed, for example, in a suitable storage media or is downloadable over an information network, has a computer program logic 30 configured to provide the different applications of the method described above for monitoring the condition of the fabric 32, 33.

The methods, systems and computer program logics 30 according to the invention can be arranged as part of the machine control automation, for example. The condition monitoring of fabrics 32 and the monitoring of quality and/or the hardness of the roll 45 can be automatic and take place mainly in continuous-time. Thus, by using the methods described above, it is possible to provide condition monitoring methods, which do not involve work safety risks while performing measurements. In addition, an advantage is that the systems are automated, real-time and learning. In the case of rolls 45, the invention can be applied to all of the reeling steps of a fiber web and paper finishing machine 10 (parent rolls and shipping rolls as examples).

It is understood that the above description and the figures related thereto are only intended to illustrate the present invention. Thus, the invention is not only limited to the embodiments proposed above or those defined in the claims, but many different variations and modifications of the invention, which are possible within the inventive idea defined in the appended claims, will be evident to those skilled in the art.

The invention claimed is:

1. A method for monitoring the condition of a continuous loop of fabric moving in a fiber web machine or paper finishing machine, comprising the steps of:
installing a continuous loop of fabric, in a fabric run, to travel via a rotating machine element which is equipped with a sensor assembly measuring force or pressure and against which the continuous fabric moves;
after installing the continuous loop of fabric in the fabric run, rotating the machine element against the continuous loop of fabric such that the sensor assembly produces a measurement signal measuring force or pressure;
forming a reference cross-directional profile of force or pressure after installing the continuous loop of fabric in the fabric run with the sensor assembly;
storing the reference cross-directional profile;
during operation of the continuous loop of fabric in the fabric run, after the reference cross-directional profile is formed and stored, comparing the reference profile with another cross-directional profile formed from the measurement signal and representing force or pressure generated between the machine element and the continuous loop of fabric, to form a comparison; and monitoring the condition of the continuous loop of fabric with the comparison.

2. The method of claim 1 wherein the sensor assembly includes at least one electromechanical film sensor disposed on a shell formed by the machine element.

3. The method of claim 2 wherein the sensor assembly is set in the machine element so as to extend helically in a rising manner.

4. The method of claim 1 wherein the sensor assembly includes sensors formed of one or more discrete force or pressure sensors in a band disposed on a shell of the machine element.

5. The method of claim 1 wherein the said cross-directional profile of force or pressure is a tension profile of the continuous loop of fabric.

6. The method of claim 1 wherein the machine element is a lead roll of the fabric run.

7. The method of claim 1 wherein the machine element is a roll and forms a press nip in the fabric run.

8. The method of claim 7 wherein the reference profile is formed by measuring the cross-directional profile of the press nip; and wherein the cross-directional profile of the press nip is compared with the reference profile to determine changes caused by the wear of the continuous loop of fabric.

9. The method of claim 1 wherein a visual representation is produced from the comparison for monitoring the condition of the continuous loop of fabric.

10. The method of claim 1 wherein during the comparison, a differential profile is formed of a tension profile of the continuous loop of fabric or the cross-directional profile of a press nip and the reference profile, and based on the differential profile, indices are determined for the condition of the continuous loop of fabric which are displayed as trends.

11. The method of claim 1 wherein at least one of the following is determined as indices for the condition of the continuous loop of fabric, the at least one selected from the group comprising: deviation of a differential profile, and deviation of a real-time tension profile and a cross-directional profile of a press nip, and peak-to-peak variation of the differential profile, and an individual value in the tension profile and an individual value cross-directional profile of the press nip.

12. The method of claim 1 wherein a real-time tension profile of the continuous loop of fabric or a cross-directional profile of the press nip and one or more differential profiles are displayed as a chart or a waterfall plot.

13. The method of claim 1 further comprising storing the reference cross-directional profile during an entire lifecycle of an earlier continuous loop of fabric and generating an alarm when the comparison approaches values that indicate the continuous loop of fabric has reached its end of life.

14. A method for monitoring the condition of a continuous loop of fabric moving in a fiber web machine or paper finishing machine, comprising the steps of:

installing a continuous loop of fabric, in a fabric run, to travel via a rotating machine element which is equipped with a sensor assembly measuring tension and against which the continuous loop of fabric moves, wherein the continuous loop of fabric is continually in contact with the rotating machine element;

after installing the continuous loop of fabric in the fabric run, rotating the machine element against the continuous loop of fabric such that the sensor assembly produces a measurement signal measuring fabric tension; and storing a plurality of temporally successive tension profiles and comparing a more recent one of the plurality of temporally successive tension profiles with a less recent one of the plurality of temporally successive tension profiles to identify sudden fabric failures.

15. A system for monitoring the condition of a continuous loop of fabric moving in a fiber web machine or paper finishing machine comprising:

a rotating machine element, which is equipped with a sensor assembly measuring force or pressure and against which the continuous loop of fabric in a fabric run is arranged to move;

wherein the sensor assembly is disposed on a shell or a cover of the machine element for generating a measurement signal between the roll and the moving continuous loop of fabric, corresponding to a cross-directional profile of force or pressure arranged to be generated between the roll and the moving continuous loop of fabric from the measurement signal;

wherein the system stores at least one reference profile for the cross-directional profile of force or pressure generated between the roll and the continuous loop of fabric after the fabric is installed in the fabric run, the reference profile being stored in a storage memory;

a user interface arranged to compare the cross-directional profile of force or pressure arranged to be generated with the reference cross-directional profile from the storage memory; and wherein the user interface is arranged to produce data from comparisons of the reference profile with the measurement signal for monitoring the condition of the fabric.

16. The system of claim 15 wherein the rotating machine element is a lead roll of the fabric run.

17. The system of claim 15 wherein the roll is a nip roll which is arranged to define a fabric run via a nip by which the fabric is arranged to travel.

* * * * *